3,294,800
PRODUCTION OF 4,5-DIHYDROURACIL
Matthias Seefelder, Ludwigshafen (Rhine), and Hans-Gerhard Reppe, Frankenthal, Pfalz, Germany, assignors to Badische Anilin- & Soda-Fabrik Aktiengesellschaft, Ludwigshafen (Rhine), Germany
No Drawing. Filed Sept. 13, 1963, Ser. No. 308,649
8 Claims. (Cl. 260—260)

This invention relates to a process for the production of 4,5-dihydrouracil from acrylic acid and urea.

4,5-dihydrouracil may be prepared by electrolytic reduction of barbituric acid (J. Tafel and A. Weinschenk, Ber. 33, 3385 (1900)). It is also known that 4,5-dihydrouracil is obtained when succinamide is treated with potassium hypobromite solution and then the reaction mixture is heated to about 60° C. (Weidel and Roithner, Monatsh. 17, 174 (1896)). Furthermore 4,5-dihydrouracil can be obtained by reaction of acrylic acid, acrylic acid esters, acrylamide sulfate or β-alanine with urea. In all the said methods, the desired 4,5-dihydrouracil is obtained only in moderate yields.

It is an object of this invention to provide a process for the production of 4,5-dihydrouracil in which the desired substance is obtained in considerably better yields than by the prior art methods.

It is a further object of this invention to provide a process for the production of 4,5-dihydrouracil in which the latter can be separated from the reaction mixture in a very simple way.

Another object of this invention is to provide a process by which 4,5-dihydrouracil is obtained in high purity.

Furthermore it is an object of this invention to provide a process by means of which 4,5-dihydrouracil may be prepared continuously.

These objects are achieved by reacting acrylic acid and urea at temperature between 100° and 250° C. in the presence of sulfuric acid as a solvent, adding water to the reaction mixture and separating the 4,5-dihydrouracil which crystallizes out.

The weight ratio of sulfuric acid to urea should advantageously be between 2:1 and 1:1. A ratio of 1.6:1 to 1.4:1 is preferred. The sulfuric acid used should preferably be at least 90% by weight strength. It is however also possible to work with anhydrous sulfuric acid or an acid having a free $SO_3$ content of up to 20% by weight. The best results are achieved by using a 90 to 100% by weight sulfuric acid.

The weight ratio of the initial materials acrylic acid and urea may be varied within wide limits, for example 0.2:1 or 1:1. In order to obtain the 4,5-dihydrouracil as pure as possible, it is advantageous to use a slight deficiency of acrylic acid.

The process may be carried out at atmospheric pressure or at superatmospheric pressure, for example at 0.5 to 10 atm. gauge. The pressure may be created by the intrinsic pressure of the reacting mixture or may be controlled additionally by forcing in inert gases, for example nitrogen or nitrogen monoxide. It is advantageous to exclude air.

It is advantageous to place sulfuric acid in the reactor and to add the urea, cooling if necessary. The mixture is then heated to the said temperature and acrylic acid slowly added with stirring. It is also possible to drip sulfuric acid into a mixture of acrylic acid and urea heated to the appropriate temperature. In either case it is recommendable that the mixture should be kept at the reaction temperature and stirred for some time after the acrylic acid or sulfuric acid has been added.

The reaction mixture is obtained in the form of a thick colorless crystalline mash and is diluted with water, for example with 0.5 to 10 times the amount of the reaction mixture; the crystalline 4,5-dihydrouracil is separated by centrifuging or by suction filtration and dried. It has a high degree of purity and a melting point of 270° to 271° C. It is obtained analytically pure by a single recrystallization from water. It may be used for the production of pharmaceuticals.

The process may be carried out batchwise or continuously. For continuous operation, for example a mixture of urea and sulfuric acid heated to 90° C. and at the same time acrylic acid in the above-mentioned ratio are supplied to a reaction tube heated to the condensation temperature. The effluent reaction mixture is then mixed with water and the 4,5-dihydrouracil which separates out is removed by suction filtration.

The invention is further illustrated by the following example. The parts specified in the example are by weight.

EXAMPLE 900 parts of concentrated sulfuric acid is placed in a 6-l. flask. 630 parts of urea is added in portions in the course of ten to fifteen minutes, the whole heated under an atmosphere of nitrogen monoxide to 135° C. and 470 parts of acrylic acid is then dripped in during forty minutes. The whole is stirred for another forty-five minutes at 140° C., allowed to cool, 900 parts of water is added, and the product separated by suction filtration and dried at 70° C. at 20 mm. Hg 635 parts of 4,5-dihydrouracil having a melting point of 270° to 271° C. is obtained. This is 85% of the theory with reference to acrylic acid used.

We claim:
1. A process for the production of 4,5-dihydrouracil which comprises reacting acrylic acid with urea in sulfuric acid having a minimum strength of at least 90% by weight and a maximum strength of 20% by weight free $SO_3$ as a solvent, diluting the reaction mixture with water and separating the 4,5-dihydrouracil formed.
2. A process as claimed in claim 1 wherein the reaction is carried out at between 100° and 250° C.
3. A process as claimed in claim 1 wherein the weight ratio of sulfuric acid to urea is between 2:1 and 1:1.
4. A process as claimed in claim 1 wherein the weight ratio of sulfuric acid to urea is between 1.6:1 and 1.4:1.
5. A process as claimed in claim 1 wherein sulfuric acid of 90 to 100% strength is used as the solvent.
6. A process as claimed in claim 1 wherein the weight ratio of acrylic acid and urea is between 0.2:1 and 1:1.
7. A process as claimed in claim 1 wherein air is excluded.
8. A process as claimed in claim 1 wherein a pressure of 0.5 to 10 atmospheres is used.

References Cited by the Examiner
UNITED STATES PATENTS
2,688,020   8/1954   Mackay et al. _____ 260—260

OTHER REFERENCES
Brown: The Pyrimidines, pages 430–432 and 459, published by Interscience Publishers, New York (1962).

ALEX MAZEL, Primary Examiner.
HENRY R. JILES, Examiner.
J. W. ADAMS, JR., Assistant Examiner.